Jan. 17, 1967  A. A. KLEBBA  3,299,368
LASER LIGHT GATE WITH PIEZOELECTRIC CRYSTAL
Filed June 24, 1963
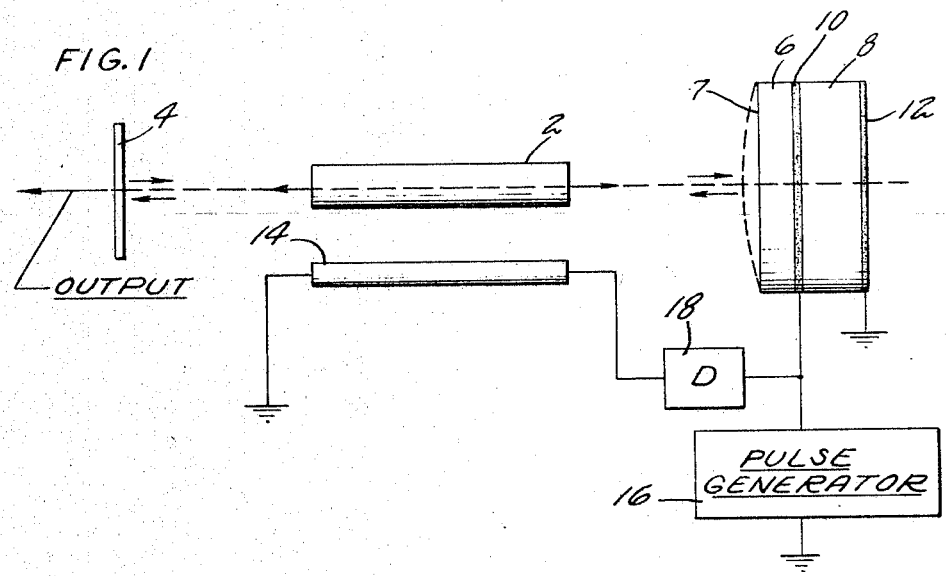
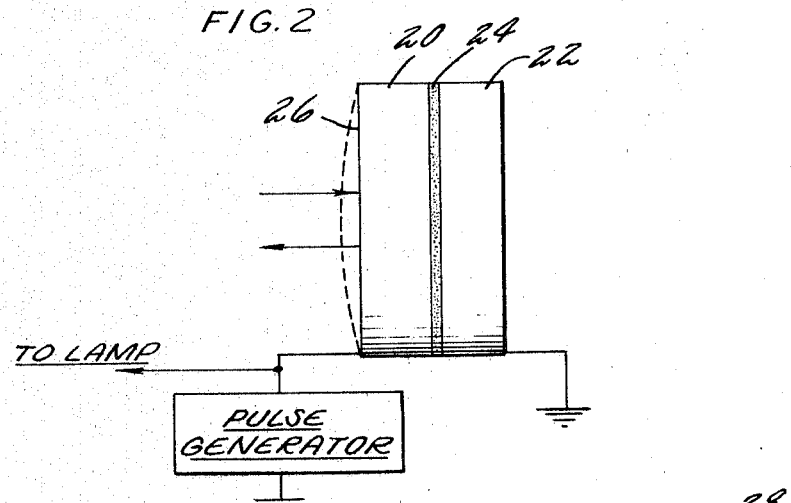
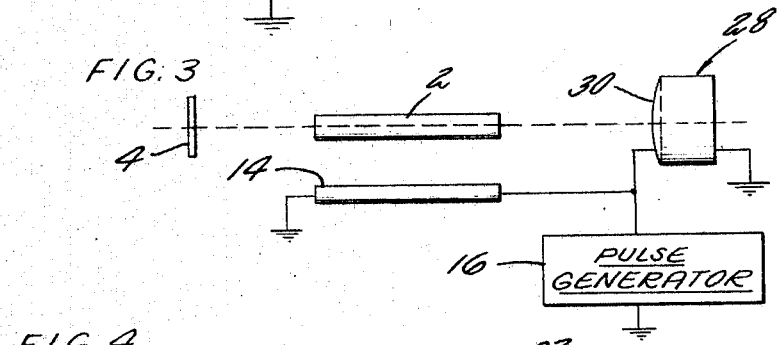
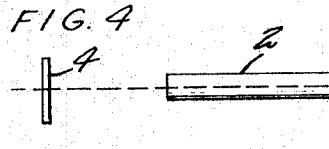
INVENTOR
ARTHUR A. KLEBBA
BY David S. Fishman
ATTORNEY United States Patent Office 3,299,368
Patented Jan. 17, 1967

3,299,368
LASER LIGHT GATE WITH PIEZOELECTRIC CRYSTAL
Arthur A. Klebba, Thompsonville, Conn., assignor to United Aircraft Corporation, East Hartford, Conn., a corporation of Delaware
Filed June 24, 1963, Ser. No. 290,111
10 Claims. (Cl. 331—94.5)

This invention relates to a system for controlling the output of a laser. More particularly, this invention relates to a laser light gate in which the output of a laser is gated by piezoelectrically varying the contour of one of the reflecting surfaces in a laser system.

The usual laser system has an active laser element, such as a ruby rod, which is excited by a flash tube to cause an optical oscillation to take place in the cavity of the system. The cavity can be the rod itself if the ends are reflective, or the cavity can be defined by separate reflectors external of the rod placed normal to the axis of the rod at each end of the rod. If the Q of the cavity can be kept low until the greater portion of the flash tube energy is absorbed and then the Q made large, lasing action will take place in the form of a very large burst of energy. This gating action, or Q switching, is useful in using the laser as a ranging device and also allows control of laser output for other purposes such as welding or cutting.

In the present invention the gating of laser action is accomplished by using piezoelectric action to vary the contour of an external reflector in a laser system. When the reflector is flat and perpendicular to the axis of the laser rod, lasing action can take place whenever the laser is pumped since the reflector reflects the internal electromagnetic radiation back to the laser rod. However, when the contour of the surface of the reflector is varied, all of the internal electromagnetic radiation is not returned to the laser rod, and lasing action does not occur. Also, by inhibiting laser action until all of the pumping energy is absorbed, a large overpopulation of excited atoms results and a very large burst of radiation is accomplished when lasing action is permitted. To these ends, the present invention uses piezoelectric elements which are either bonded to an external reflector of a laser system or polished to serve as the external reflector, and the contour of the reflector is varied by the imposition of an electrical field across the piezoelectric element to thereby gate laser output.

Accordingly, one object of the present invention is to produce an electrically modulated laser light gate.

Another object of the present invention is to produce an electrically modulated laser light gate through the application of piezoelectric principles.

Still another object of the present invention is to produce a laser system in which the Q of the cavity is electrically controlled.

Still another object of the present invention is to produce a laser light gate in which the contour of an external reflector is electrically varied to gate laser output.

Other objects and advantages will be apparent from the specification and claims, and from the accompanying drawings which illustrate an embodiment of the invention.

FIGURE 1 is a showing of the laser light gate of the present invention.

FIGURE 2 is a modification of the electrically variable reflector of FIG. 1.

FIGURE 3 is a showing of a modification of the laser light gate of FIG. 1.

FIGURE 4 is another modification of the laser light gate of FIG. 1 especially suitable for high power applications.

Referring now to FIG. 1, a laser system is shown which includes an active laser element such as a ruby rod 2. Reflectors 4 and 6 are aligned to intercept the electromagnetic radiation from active element 2 and return it to element 2, reflectors 4 and 6 defining therebetween the optical cavity of the laser system. Reflector 4 is less reflective than reflector 6, and reflector 4 is flat and is aligned perpendicular to the axis of element 2. The contour of reflector 6 is made to vary as hereinafter described so that it varies between a flat surface perpendicular to the axis of element 2 to either a convex or concave spherical shape. A radially polarized piezoelectric element 8, comprised of materials such as barium titanite, or lead zirconite titanite, is bonded to reflector 6 by an electrically conductive bonding layer 10 such as conductive epoxy resin, and a coating 12 of silver or other good conductor is applied to the surface of piezoelectric element 8 removed from reflector 6. Both reflector 6 and piezoelectric element 8 are shaped as cylindrical discs and are coaxial with or centered on the axis of element 2. A flash tube 14 supplies pumping energy to excite the laser in well-known fashion.

Since piezoelectric element 8 is radially polarized, an electric field established across element 8 will cause element 8 to expand or contract radially depending upon the direction of the electric field, i.e., whether the field is from left to right or from right to left across the crystal as the crystal is shown in FIG. 1.

In the embodiment shown in FIG. 1, the reflecting surface 7 of reflector 6 is normally flat. Pulse generator 16 is connected to deliver the output thereof across piezoelectric element 8, and the output from pulse generator 16 is also delivered through delay 18 to flash tube 14 to energize the flash tube and provide pumping energy for the laser. When a pulse from pulse generator 16 is electrically impressed across piezoelectric element 8, element 8 either expands or contracts radially and varies the contour of reflecting surface 7 so that reflecting surface becomes of spherical contour, concave or convex, respectively. Assuming that element 8 is caused to contract by the field across the element, surface 7 will be deformed to become spherically convex as shown by the dotted lines in FIG. 1. This nonflat surface will scatter the electromagnetic radiation from the laser rather than reflecting it back to the laser, and hence lasing action will not occur.

The output from pulse generator 16 also triggers flash lamp 14 to pump active laser element 2. In the system of FIG. 1 it is desired to pump element 2 only after reflecting surface 7 becomes convex. Accordingly, delay 18 is inserted in the supply line to flash tube 14 to compensate for the inherently relatively slow response of piezoelectric element 8 so that pumping of active laser element 2 will not be initiated until reflecting surface 7 has been deformed.

Since the occurrence of lasing action is inhibited by the scattering effect of the spherically convex shape of surface 7, active laser element 2 absorbs most of the energy of pumping lamp 14 and a condition of high overpopulation of excited atoms in active laser element 2 occurs. At the termination of a pulse from generator 16 the electric field is removed from across piezoelectric element 8, reflecting surface 7 returns to its flat condition, and the electromagnetic radiation from active laser element 2 is reflected from surface 7 back to element 2 to initiate lasing action with a very large burst of output energy through reflector 4.

Referring now to FIG. 2, a modification of the reflector 6 and piezoelectric element 8 of FIG. 1 is shown.

In FIG. 2, a pair of piezoelectric crystals such as quartz crystals 20 and 22 are bonded together by a bonding material such as Eastman 910 adhesive or a high strength epoxy resin 24. The face 26 of crystal 20 is highly polished to form a reflecting surface similar to the reflecting surface 7 of FIG. 1. The crystals 20 and 22 are arranged so that the highly fundamental active axis of each crystal is at a right angle to the highly fundamental active axis of the other crystal; the highly fundamental active axis of a crystal defining the direction of greatest expansion or contraction under the influence of an electric field and being referred to by some authorities as the y axis which departs approximately 18° from the y axis in an x cut crystal. (See Mason, Piezoelectric Crystals, p. 97 [Von Nostrand, 1956].) Crystals 20 and 22 are arranged so that the y axis of crystal 20 contracts and the y axis of crystal 22 expands under the influence of an electrical field across both crystals so that normally flat reflective surface 26 will be deformed into a spherical configuration.

The structure shown in FIG. 2 is intended to be a substitute for reflector 6 and piezoelectric element 8 of FIG. 1 and would be operated in the same manner as described in connection with the structure of FIG. 1.

Thus, a laser light gate system has been described in connection with FIGS. 1 and 2 in which a normally flat reflecting surface is varied through piezoelectric action to prevent the occurrence of lasing action while pumping of the laser takes place, and in which the reflecting surface is then returned to its normally flat condition to initiate lasing action with a large burst of energy.

Referring now to FIG. 3, a laser light gate system is shown which is a modification of the system of FIG. 1. The structure of FIG. 3 differs from FIG. 1 only in that the delay 18 has been omitted and in that the structure of the piezoelectric element and reflector unit 28 differs slightly from that shown in FIGS. 1 and 2 in that the reflecting surface is polished to have a normally spherically convex surface for the reflector arrangement of either FIGS. 1 or 2. Except for the normally curved reflecting surface 30, the piezoelectric element and reflector unit 28 can be of the type shown in either FIG. 1 or FIG. 2. In the operation of the system of FIG. 3, a pulse from generator 16 triggers pumping lamp 14 to deliver pumping energy to laser rod 2. The pulse from generator 16 is also delivered to unit 28 to impose an electric field thereacross to cause the normally curved surface 30 to become flat as shown in the dotted lines. However, because of the relatively slow response time of piezoelectric elements, the varying of the contour of surface 30 occurs after active laser element 2 has absorbed all or the greater part of the pumping energy from lamp 14. The normally curved reflector surface 30 scatters the electromagnetic radiation from the laser so that the lasing action does not take place until the piezoelectric element reacts to the electric field to vary surface 30 to the flat condition. The internal electromagnetic radiation is then reflected back to active laser element 2 and lasing action occurs with a large burst of radiation.

In the configurations shown in FIGS. 1–3 it will be apparent that some electromagnetic radiation will be reflected back to the active laser element from the central portion of the piezoelectrically controlled reflector even when piezoelectrically controlled reflector is in the nonflat condition. This is so because the electromagnetic radiation incident on the curved surface of the piezoelectrically controlled reflector is very nearly perpendicular to the surface of the reflector at the central portion thereof when the reflector and the active laser element are coaxial as shown in FIGS. 1–3. In very high power applications this premature reflection could cause untimely lasing action.

The structure of FIG. 4 avoids this unwanted or premature reflection by positioning the piezoelectrically controlled reflector so that it is not coaxial with active laser element 2. The structure shown in FIG. 4 is similar to that shown in FIGS. 1–3, and the piezoelectrically controlled reflector unit 32 can be of any of the types shown in FIGS. 1–3. Of course, the proper coordination would be provided between the pumping of active laser element 2 and piezoelectric action of unit 32. The reflector unit 32 is positioned so that its axis does not coincide with the axis of element 2. In this manner, the electromagnetic radiation incident on the reflector when the reflecting surface of unit 32 is in the spherical condition is all reflected away from element 2 to eliminate undesired reflection back to element 2.

With respect to the FIG. 3 configuration, it will be obvious that a delay could be incorporated in the line delivering the output from the pulse generator to unit 28 if necessary. It will also be understood with respect to all embodiments that delays can be manipulated as desired to coordinate pumping action with piezoelectric element action in any desired fashion. It will also be understood that the reflecting surfaces which are varied by piezoelectric action can be made to vary between flat and concave or between flat and any nonflat condition rather than between flat and convex as described. It will also be understood that the repetition rate of the laser light gate described in FIGS. 1–4 will be determined by the frequency of the pulse generator, and it will be readily apparent that pulse generator frequency can be varied or the output of the pulse generator can be frequency or amplitude modulated to gate laser output in accordance with any desired pattern.

It is to be understood that the invention is not limited to the specific embodiment herein illustrated and described but may be used in other ways without departure from its spirit as defined by the following claims.

I claim:

1. A laser system including an active laser element, a first reflector associated with one end of said laser element, means for energizing said laser element, at least one piezoelectric element, at least one surface of said piezoelectric element being of variable contour with respect to the other end of said laser element in response to an electric field across said piezoelectric element, a second reflector on said one surface of said piezoelectric element, said second reflector facing said other end of said laser element, and means for establishing an electric field across said piezoelectric element to vary the contour of said one surface of said piezoelectric element with respect to said other end of said laser element whereby the contour of said second reflector is varied between nonparallelism and substantial parallelism with said first reflector to gate the output of said laser.

2. A laser system as in claim 1 wherein said active laser element has an axis and wherein said second reflector has an axis, said second reflector being positioned so that the axis of said second reflector is spaced from the axis of said laser element.

3. A laser system including an active laser element, a first reflector associated with one end of said laser element, means for energizing said laser element, a radially polarized piezoelectric element, at least one surface of said piezoelectric element being of variable contour with respect to the other end of said laser element in response to an electric field across said piezoelectric element, a second reflector on said one surface of said piezoelectric element, said second reflector facing said other end of said laser element and said second reflector being more reflective than said first reflector, and means for establishing an electric field across said piezoelectric element to vary the contour of said one surface of said piezoelectric element with respect to said other end of said laser element whereby the contour of said second reflector is varied between nonparallelism and substantial parallelism with said first reflector to gate the output of said laser.

4. A laser system as in claim 3 wherein said second reflector is normaly flat and substantially parallel to said first reflector, and wherein the electric field is established across said piezoelectric element to curve said second reflector during delivery of pumping energy to said laser element, and wherein the electric field is removed from across said piezoelectric crystal at the end of the delivery of pumping energy to said laser element to return said second reflector to its normally flat condition and initiate lasing action.

5. A laser system as in claim 3 wherein said second reflector is normally curved, and wherein the electric field is established across said piezoelectric element at the end of the delivery of pumping energy to said laser element to flatten said second reflector to a state of substantial parallelism with said first reflector and initiate lasing action.

6. A laser system including an active laser element, means for energizing said laser element, a first reflector associated with one end of said laser element, a first piezoelectric crystal, a second deflector on said first piezoelectric crystal, said second reflector facing the other end of said laser element and said second reflecting surface being more reflective than said first reflecting surface, a second piezoelectric crystal bonded to said first piezoelectric crystal on the side removed from said second reflector, said first and second crystals being oriented so that the highly fundamental active axis of each of said crystals is perpendicular to the high fundamental active axis of the other crystal, and means for establishing an electric field across said crystals to vary the contour of said first piezoelectric crystal with respect to said other end of said laser element whereby the contour of said second reflector is varied between nonparallelism and substantial parallelism with said first reflector to gate the output of said laser.

7. A laser system as in claim 6 wherein said first and second crystals are quartz.

8. A laser system as in claim 6 wherein one face of said first piezoelectric crystal is reflective to form said second reflector.

9. A laser system as in claim 6 wherein said second reflector is normally flat and substantially parallel to said first reflector, and wherein the electric field is established across said crystals to curve said second reflector during delivery of pumping energy to said laser element, and wherein the electric field is removed from across said crystals at the end of the delivery of pumping energy to said laser element to return said second reflector to its normally flat condition to initiate lasing action.

10. A laser system as in claim 6 wherein said second reflector is normally curved, and wherein the electric field is established across said crystals at the end of the delivery of pumping energy to said laser element to flatten said second reflector to a state of substantial parallelism with said first reflector and initiate lasing action.

No references cited.

JEWELL H. PEDERSEN, *Primary Examiner.*

W. L. SIKES, *Assistant Examiner.*